United States Patent Office 2,992,278
Patented July 11, 1961

2,992,278
PROCESS FOR PRODUCTION OF 1,4 SATURATED DIOLS
Robert J. Tedeschi, Whitehouse Station, N.J., assignor to Air Reduction Company, Incorporated, New York, N.Y., a corporation of New York
No Drawing. Filed Dec. 12, 1957, Ser. No. 702,255
10 Claims. (Cl. 260—617)

This invention relates to a novel process for the manufacture of saturated 1,4-diols in high yields and high purity. More particularly, it concerns a process for producing tertiary saturated 1,4-diols by the complete catalytic hydrogenation of the corresponding tertiary acetylenic 1,4-diols.

Heretofore, the processes used for hydrogenating tertiary acetylenic 1,4-diols have not resulted in the production of tertiary saturated 1,4-diols in high yields and of high purity. In many instances the catalyst system employed resulted in an incomplete hydrogenation whereby the triple bond was partially saturated with the formation of a double bond which was not further reduced resulting in the formation of an olefinic diol. Such a system is the nickel-alkaline material catalyst system disclosed in Vaughn U.S. Patent 2,157,365. On the other hand, other catalyst systems, such, for example, as platinum and palladium catalysts disclosed in the above referred to Vaughn patent, effect complete hydrogenation but do not prevent the occurrence of hydrogenolysis side reactions. When such side reactions occur there is produced a substantial amount of undesirable side reaction products and a low amount of the desired tertiary saturated 1,4-diol.

When a catalyst is employed which serves to effect complete hydrogenation, the hydrogenation and hydrogenolysis of tertiary acetylenic 1,4-diols may be shown to proceed by the following route:

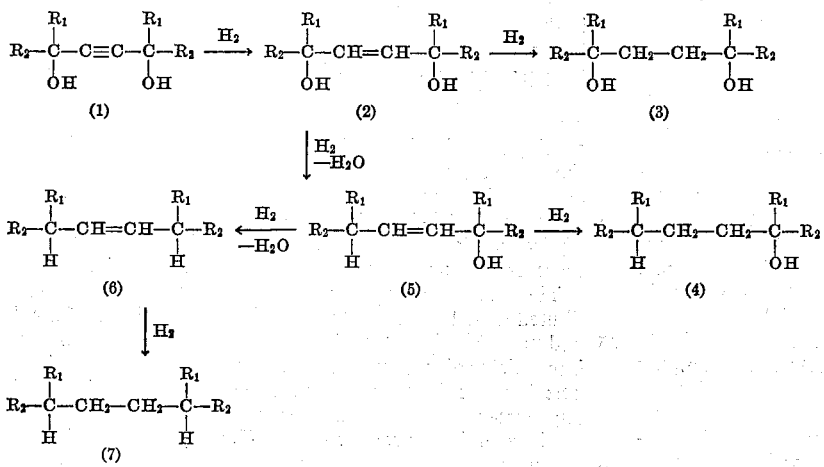

It is seen from the above route that complete catalytic hydrogenation of tertiary acetylenic 1,4-diols is in general an unselective process resulting in low yields of the desired saturated 1,4-diol due to hydrogenolysis side reactions. For example, the complete hydrogenation of 2,5-dimethyl-3-hexyn-2,5-diol (1) yields a mixture of 2,5-dimethyl hexane (7), 2,5-dimethyl-hexane-2-ol (4), 2,5-dimethyl-3-hexene-2-ol (5), and the desired 2,5-dimethyl hexane-2,5-diol (3). The 1,4-saturated diol is generally isolated in 10–32% yield on complete hydrogenation.

Accordingly, it is the object of this invention to provide a novel process for the production of tertiary saturated 1,4-diols in high yields and of high purity. More particularly, it is an object of this invention to provide a novel process for the production of tertiary saturated 1,4-diols, in high yields and of high purity, by the complete catalytic hydrogenation of the corresponding tertiary acetylenic 1,4-diols without appreciable hydrogenolysis side reactions.

It has been found that the above objects may be realized by completely hydrogenating a tertiary acetylenic 1,4-diol in the presence of a catalyst system comprising a metal catalyst selected from the group consisting of palladium, platinum and rhodium and a small amount of an alkaline material such, for example, as NaOH, KOH or triethylamine. Advantageously, by the use of a small amount of such alkaline material in conjunction with the aforementioned hydrogenation catalysts, hydrogenolysis side reactions are substantially completely suppressed. By the present process extremely high yields of the saturated 1,4-diols are obtained through the hydrogenation of acetylenic 1,4-diols without undesirable formation of other products.

In general, the present process involves dissolving the alkaline material in the acetylenic 1,4-diols at a suitable temperature, said diol being either dissolved in a suitable inert solvent or in molten form. The palladium or platinum catalyst is then added and the hydrogenation carried out at a moderate temperature and pressure. The hydrogenation is carried out until there is no longer a drop in pressure indicating that the reaction is complete.

The present invention is applicable generally to the complete hydrogenation of the class of acetylenic 1,4-diols of the type

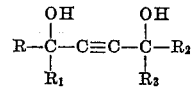

wherein R, $R_1$, $R_2$ and $R_3$, respectively designate either hydrogen, or the same or a different alkyl, cycloalkyl or aryl group. Examples of such diols are:
2,5 - dimethyl - 3 - hexyne - 2,5 - diol, 3,6 - dimethyl-4 - octyne - 3,6 - diol, 2,4,7,9 - tetramethyl - 5 - decyne-4,7 - diol, 4,7 - dimethyl - 5 - decyne - 4,7 - diol, 2,5 - diphenyl - 3 - hexyne - 2,5 - diol and bis - (cyclohexyl) acetylene glycol.

Any solvent which will dissolve the tertiary acetylenic diol and which does not react with it may be used. This will vary depending upon the particular material used. Since the alkaline material used in accordance with this invention is readily soluble in molten, low melting (35–55° C.) acetylenic diols due to alcoholate or complex formation, the solvent is not needed to effect solution of the base. In fact, KOH and NaOH which are completely insoluble in non-polar solvents such as petroleum ether, hexane, heptane, toluene, etc., dissolve in a solution of the acetylenic diol in any of these solvents. The base employed should be soluble in the diol-solvent mixture and not merely dispersed in it since this will inhibit its adsorption (chemisorption) upon the catalyst surface. Heptane has been found to be an excellent solvent for dimethyl octynediol, dimethyl decynediol and tetramethyl decynediol. Toluene is the preferred solvent for dimethyl hexynediol, while the preferred solvents for diphenyl hexynediol and bis-cyclohexyl glycol are methanol and isopropanol.

Complete hydrogenation in accordance with the present invention is carried out under moderate pressure and temperature. In general, the pressure is in a range from 30 to 500 p.s.i.g. and preferably 30 to 50 p.s.i.g.; and, the temperature is in general in the range of 55 to 125° C. and preferably in the range of 55 to 85° C. When the temperature is significantly below the indicated minimum temperature the hydrogenation rate is too slow; while when it is much above the indicated maximum temperature, the base catalyzed decomposition of the acetylenic diol into a mixture of ethynyl carbinol, ketone and free acetylene takes place. After the reaction mixture has been heated to a suitable temperature to initiate the reaction, no additional heat is necessary in the first stage of hydrogenation for the reaction is exothermic. However, heat is applied subsequently to effectuate complete hydrogenation.

As indicated hereinabove, the presence of a small amount of alkaline material in conjunction with a palladium, rhodium or platinum catalyst effects complete hydrogenaton of the tertiary acetylenic 1,4-diol so as to produce the corresponding tertiary saturated 1,4-diol in high yields and of high purity. Any alkaline reacting agent may be used for this purpose, such, for example, as an alkali metal hydroxide or a basic organic amine which can react with the acetylenic diol to form either an alcoholate (alkoxide) or complex in which hydrogen bonding may be involved. Examples of additional alkaline materials which may be used are alkali metal hydroxides such, for example, as lithium hydroxide, cesium hydroxide and rubidium hydroxide; and, tertiary amines such, for example, as pyridine and tripropylamine. By employing such a catalyst system the process is selective resulting in the production of the desired tertiary saturated 1,4-diol without appreciable hydrogenolysis side reactions. The catalyst may be in any amount normally used for hydrogenation reactions. When the catalyst is a supported catalyst containing 5% metal catalyst such, for example, as palladium on charcoal, excellent results have been obtained when the supported catalyst (carrier plus metal catalyst) is in an amount from 0.25 to 1.0 g. (.0125 to .05 g. metal catalyst) per mole of tertiary acetylenic 1,4-diol. Of course the amount of catalyst employed affects the amount of alkaline material or base that should be employed. For example, 1.0 g. of Pd on charcoal (5% Pd) catalyst generally requires 0.025–0.05 g. of alkaline material, while 0.25 g. of the same catalyst generally requires 0.0063 to 0.0125 g. of base. Preferably, it is preferred to employ a catalyst supported on an inert catalyst, such, for example, as platinum on charcoal, rhodium on charcoal, or palladium on charcoal. Neutral charcoal is the preferred carrier for it is inert and does not interfere with complete hydrogenation. Any other carrier which does not prevent complete hydrogenation may be used, however, such, for example, as $CaCO_3$, $BaCO_4$, $BaSO_4$ and neutral clays.

Carriers which tend to limit the hydrogenation to semihydrogenation should be avoided. Acidic carriers should be avoided since they tend to cause dehydration of acetylenic diols to ene-yn-ol structures. Hence, carriers containing acidic mixtures $H_2SO_4$, HCl, $H_3PO_4$, acetic acid, boric acid, acid sulfates, acidic phosphates must be avoided as well as acid washed charcoal. Also, carriers containing sulfur or metallic carbinols or heavy metal impurities may be poisonous to the catalyst. The catalyst is preferably supported since the hydrogenation art and practical considerations make this advisable. If so desired, however, the carrier may be eliminated and the catalyst suspended in the reaction mixture before hydrogenation.

The alkaline material should be present in an amount sufficient to prevent hydrogenolysis side reactions and yet permit complete hydrogenation. The amount of alkaline material required will vary depending upon the alkaline material that is employed and the particular acetylenic diol that is to be completely hydrogenated. Also, as pointed out hereinbefore, the amount of catalyst employed will affect the amount of base required. In general, the alkaline material is in a range of 0.01 to 0.3 g. and preferably .05 to 0.2 g. per mole of acetylenic glycol. For acetylenic diols such, for example, as dimethyloctyndiol, diphenyl hexyndiol, 4,7-dimethyl-5-decyne - 4,7 - diol and 2,4,7,9 - tetramethyl - 5 - decyne-4,7-diol, a range of 0.025 to 0.05 g. is generally employed with 0.05 g. being preferred. For acetylenic diols exemplified by dimethyl hexyndiol lower amounts are generally used in the range of 0.015 g. to 0.025 g. with 0.025 g. being preferred. If the alkaline material is in an amount well below the above indicated ranges inadequate hydrogenolysis inhibition is obtained while if the alkaline material is in an amount well above the indicated range incomplete hydrogenation results.

The following general procedure may be used for producing tertiary saturated 1,4-diols from corresponding tertiary acetylenic 1,4-diols in accordance with the present invention:

Into a 250 ml. Parr hydrogenation bottle is weighed 0.50 mole of the acetylenic diol. The diol is then treated with 100 cc. of a suitable solvent such, for example, n-heptane when dimethyl octynediol is the reactant diol or isopropanol when a less soluble diphenyl hexynediol is the diol. The diol is heated to solution at a suitable temperature such, for example, as 60–65° C. and is quickly treated with 0.025 g. of a suitable alkaline material such, for example, as powdered KOH and stirred at 60–65° C. for 2–5 minutes until the KOH has completely dissolved.

One gram of palladium on charcoal catalyst (5% Pd) is then added to the solution at 60–65° C. and then the hydrogenation begun without delay. The hydrogenation temperature and pressure employed is 60–65° C. and 30–55 p.s.i.g. The reaction during this stage of the reaction is exothermic and requires frequent air or water cooling to maintain the desired temperature range. When the reaction proceeds to a point where it is no longer exothermic, external heating is applied to raise the temperature to 65–75° C. to complete the hydrogenation. Hydrogenation to the saturated diol is continued until there is no further pressure drop after 30 minutes.

The reaction mixture is filtered to separate the catalyst, diluted with 100 cc. heptane (including washing of funnel and transfer rinses) and transferred to a typical water-immiscible solvent azeotrope separator (Dean Stark tube). The heptane layer is heated under vigorous reflux and any water of hydrogenolysis collected and measured. Hydrogenations protected with KOH yield insignificant amounts (less than 0.20 g.) of water while unprotected hydrogenations yield 6–10 g. water per 0.50 mole run.

Heptane is flash distilled from the desired diol at atmospheric pressure to a pot temperature of 130° C. followed by gradually diminished pressure. The saturated diols are vacuum distilled through a twelve inch vacuum jacketed Vigreux at the following temperatures and pressures:

| Saturated diols | Temperature (° C.) and Pressure |
| --- | --- |
| 2,5-dimethylhexane-2,5-diol | 95/4 mm. (M.P. 88–89). |
| 3,6-dimethyloctane-3,6-diol | 125–127/10 mm. (viscous liquid). |
| 4,7-dimethyldecane-4,7-diol | 125–127/3 mm. (viscous liquid). |
| 2,4,7,9-tetramethyldecane-4,7-diol | 131–133/3 mm. (viscous liquid). |
| Bis-cyclohexane-1,2-ethanediol | (M.P. 132–133). |

Higher melting diols such as those derived from dimethyl hexynediol, diphenyl hexynediol and bis-cyclohexyl acetylene glycol are best purified by recrystallization from solvents such as toluene or isopronanol.

If a significant amount of hydrogenolysis takes place during a hydrogenation (absence of KOH), a large amount of low boiling material is obtained which consists mainly of the saturated hydrocarbon, the monoolefinic alcohol and the monosaturated alcohol. Below is summarized a typical distillation of an unprotected hydrogenation of dimethyl decynediol.

Distillation (13 mm.):
    (a) 70–85° C_____ 22 g. (hydrocarbon plus dimethyl decanol).
    (b) 92–93° C_____ 54 g. (57.7% conv.) dimethyl decanol.
    (c) 100–123–125° C_____ 14.5 g. (7.2% conv.) crude saturated diol.

Following the general procedure outlined above, a number of tertiary acetylenic 1,4-diols were hydrogenated at a temperature in the range of 60–65° C. and a pressure in the range of 30–55 p.s.i.g. employing 1 g. of palladium on charcoal catalyst (5% Pd). The experimental conditions and results of these examples are summarized in Table I.

Examples II, V, VII, IX, XI, XIII and XV illustrate the process of the present invention wherein the palladium catalyst employed in conjunction with potassium hydroxide in an amount sufficient to inhibit hydrogenolysis but yet permit complete hydrogenation. Examples I, IV, VI, VIII, X, XII, XIV illustrate prior art processes utilizing the palladium catalyst in the absence of an alkaline material. Example III shows the poor results obtained when too high an amount of alkaline material is used. Accordingly, this example is outside the scope of the present invention.

From the aforementioned Table II, it will be observed that triethylamine and sodium hydroxide like potassium hydroxide inhibit hydrogenolysis but are not as effective as the preferred alkaline material potassium hydroxide.

Results of hydrogenation of dimethyl decynediol with platinum on charcoal catalyst with potassium hydroxide are summarized in Table III below. The reaction conditions of 30–55 p.s.i.g. 60–65° C. and heptane as solvent were employed.

Table III

| Example No. | g. KOH | g. H$_2$O | Saturated diol | |
|---|---|---|---|---|
| | | | Percent Yield | Percent Purity |
| XVIII | .05 | <0.20 | 83.3 | 99.97 |

It is observed from the results of Example XVIII and from the results of Example V (Table I) that palladium is a more effective catalyst than platinum when used in accordance with the present invention.

Although the foregoing disclosure is principally concerned with the hydrogenation of tertiary acetylenic 1,4-diols wherein the problem with respect to hydrogenolysis is the most serious, it should be realized that the principles of the present invention are also applicable to the hydrogenation of primary and secondary acetylenic diols.

The invention in its broader aspects is not limited to the specific steps, methods, compositions, combinations and improvements described but departures may be made therefrom within the scope of the accompanying claims without departing from the principles of the invention and without sacrificing its chief advantages.

I claim:
1. An improved process for producing a saturated 1,4-diol in high yield and purity from its corresponding acetylenic 1,4-diol comprising hydrogenating said acetylenic 1,4-diol in the presence of a catalyst selected from the group consisting of palladium, rhodium and platinum and an alkaline material, said alkaline material being present in an amount from about 0.010 to 0.3 g. per mole of teritary acetylenic 1,4-diol, whereby said acet-

Table I

| Example No. | Tertiary acetylenic 1,4-diol | Diol, moles | KOH base (g.) | Reaction Time (min.) | H$_2$O (g.) formed | Pressure Drop | | Percent | |
|---|---|---|---|---|---|---|---|---|---|
| | | | | | | Obsv. | Calc. | Conv. | Purity |
| I | Tetramethyl decynediol | (0.50m) | 0.0 | 300 | 9.0 | 101 | 85 | 33.0 | |
| II | do | (0.50m) | 0.05 | 300 | 0.2 | 85 | 85 | 89.5 | 99.9 |
| III | Dimethyl decynediol | (0.50m) | 0.20 | 840 | 0.2 | 63 | 85 | 71.3 | 74.0 |
| IV | do | (0.50m) | 0.0 | 90 | 6.0 | 122 | 85 | 7.2 | |
| V | do | (0.50m) | 0.05 | 150 | 0.2 | 85 | 85 | 94 | 99.6 |
| VI | Dimethyloctyne diol | (0.50m) | 0 | 225 | 7.5 | 109 | 85 | 15.0 | |
| VII | do | (0.50m) | 0.025 | 105 | 0.20 | 87 | 85 | 87.4 | 99.9 |
| VIII | Dimethyl hexynediol | (0.50m) | 0 | 75 | 10.2 | 131 | 85 | 31.5 | |
| IX | do | (0.50m) | 0.025 | 180 | 0.99 | 84 | 85 | 84.7 | 97.2 |
| X | Bis-cyclohexyl acetylene glycol | (0.30m) | 0 | 120 | 7.4 | 66 | 51 | 8.9 | Crude |
| XI | do | (0.30m) | 0.05 | 90 | 0.20 | 53 | 51 | 94 | 99.9 |
| XII | Diphenyl hexynediol | (0.25m) | 0 | 77 | | 57 | 42.5 | 35.6 | Crude |
| XIII | do | (0.25m) | 0.05 | 150 | 0.20 | 41 | 42.5 | 94.8 | 95 |
| XIV | do | (0.125m) | 0 | 110 | 2.31 | 27 | 21.2 | | |
| XV | do | (0.125m) | 0.015 | | 0.20 | 21.0 | 21.3 | 94 | 99.9 |

The following Examples XVI and XVII summarized in Table II illustrate the process of the present invention employing a palladium on charcoal catalyst but different alkaline materials from the KOH employed in the previous examples, i.e., NaOH and triethylamine. The temperature of the reaction in each instance was 60–70° C. and the pressure in the range of 30–55 p.s.i.g.

Table II

| Example No. | Tertiary acetylenic 1,4-diol | Diol, moles | Base (g.) | Reaction Time (min.) | H$_2$O (g.) formed | Pressure Drop | | Percent | |
|---|---|---|---|---|---|---|---|---|---|
| | | | | | | Obsv. | Calc. | Conv. | Purity |
| XVI | Tetramethyl decynediol | (0.50m) | Triethylamine (0.05) | 90 | 0.40 | 85.5 | 85 | 90.5 | 97.5 |
| XVII | Dimethyl decynediol | (0.50m) | NaOH (0.05) | 200 | 0.20 | 83 | 85 | 90 | 99.8 | ylenic 1,4-diol is converted to its corresponding saturated 1,4-diol.

2. An improved process for producing a tertiary saturated 1,4-diol in high yield and purity from its corresponding tertiary acetylenic 1,4-diol comprising hydrogenating said tertiary acetylenic 1,4-diol in the presence of a catalyst selected from the group consisting of palladium, rhodium and platinum and an alkaline material, said alkaline material being present in an amount from about 0.010 to 0.3 g. per mole of tertiary acetylenic 1,4-diol, whereby said tertiary acetylenic 1,4-diol is converated to its corespending tertiary saturated 1,4-diol.

3. An improved process for producing a tertiary saturated 1,4-diol in high yield and purity from its corresponding tertiary acetylenic 1,4-diol comprising completely hydrogenating said tertiary acetylenic 1,4-diol at a temperature in the range of 55 to 85° C. and a pressure in the range of 30 to 55 p.s.i.g. in the presence of a catalyst selected from the group consisting of palladium, rhodium and platinum and an alkaline material, said alkaline material being present in an amount from 0.05 to 0.2 gram per mole of acetylenic 1,4-diol, whereby said tertiary acetylenic 1,4-diol is converted to its corresponding tertiary saturated 1,4-diol.

4. A process according to claim 3 wherein the alkaline material is potassium hydroxide.

5. A process according to claim 3 wherein the alkaline material is a basic organic amine.

6. A process according to claim 3 wherein the tertiary acetylenic 1,4-diol as selected from the group consisting of 2,5-dimethyl-3-hexyne-2,5-diol, 3,6-dimethyl-4-octyne-3,6-diol, 2,4,7,9-tetramethyl-5-decyne-4,7-diol, 4,7-dimethyl-5-decyne-4,7-diol, 2,5-diphenyl-3-hexyne-2,5-diol and bis-(cyclohexyl) acetylenic glycol.

7. An improved process for producing a tertiary saturated 1,4-diol in high yield and purity from its corresponding tertiary acetylenic 1,4-diol comprising hydrogenating said tertiary acetylenic 1,4-diol at a temperature in the range of 55 to 125° C. and a pressure in the range of 30 to 500 p.s.i.g. in the presence of a catalyst selected from the group consisting of palladium, rhodium and platinum and an alkaline material, said alkaline material being present in an amount from about 0.010 to 0.3 g. per mole of tertiary acetylenic 1,4-diol, whereby said tertiary acetylenic 1,4-diol is converted to its corresponding tertiary saturated 1,4-diol.

8. An improved process for producing a tertiary saturated 1,4-diol in high yield and purity from its corresponding tertiary acetylenic 1,4-diol comprising hydrogenating said tertiary acetylenic 1,4-diol at a temperature in the range of 55 to 85° C. and a pressure in the range of 30 to 55 p.s.i.g. in the presence of a palladium catalyst and an alkaline material, said alkaline material being present in an amount from 0.05 to 0.2 g. per mole of acetylenic 1,4-diol, whereby said tertiary acetylenc 1,4-diol is converted to its corresponding tertiary saturated 1,4-diol.

9. An improved process for producing a tertiary saturated 1,4-diol in high yield and purity from its corresponding tertiary acetylenic 1,4-diol comprising hydrogenating said tertiary acetylenic 1,4-diol at a temperature in the range of 55 to 85° C. and a pressure in the range of 30 to 55 p.s.i.g. in the presence of a palladium catalyst on a non-acidic carrier and an alkaline material, said alkaline material being present in an amount from 0.05 to 0.2 g. per mole of acetylenic 1,4-diol, whereby said tertiary acetylenic 1,4-diol is converted to its corresponding tertiary saturated 1,4-diol.

10. An improved process for producing a tertiary saturated 1,4-diol in high yield and purity from its corresponding tertiary acetylenic 1,4-diol comprising completely hydrogenating a tertiary acetylenic 1,4-diol selected from the group consisting of 2,5-dimethyl-3-hexyne-2,5-diol, 3,6-dimethyl-4-octyne-3,6-diol, 2,4,7,9-tetramethyl-5-decyne-4,7-diol, 4,7-dimethyl-5-decyne - 4,7 - diol, 2,5-diphenyl-3-hexyne-2,5-diol and bis-(cyclohexyl) acetylene glycol at a temperature in the range of 55 to 85° C. and a pressure in the range of 30 to 55 p.s.i.g. in the presence of a palladium catalyst and an alkaline material, said alkaline material being present in an amount from 0.05 to 0.2 g. per mole of acetylenic 1,4-diol, whereby said tertiary acetylenic 1,4-diol is converted to its corresponding tertiary saturated 1,4-diol.

References Cited in the file of this patent

UNITED STATES PATENTS

| 2,157,365 | Vaughn | May 9, 1939 |
| 2,491,926 | Lorand et al. | Dec. 20, 1949 |
| 2,737,534 | Taylor et al. | Mar. 6, 1956 |

OTHER REFERENCES

Papa et al.: Jour. Amer. Chem. Soc., vol. 76 (1954), pages 4446–50 (5 pages).